United States Patent
Sampath et al.

(10) Patent No.: US 11,709,738 B1
(45) Date of Patent: Jul. 25, 2023

(54) INTELLIGENT PROTECTION OF VIRTUAL MACHINE BY IDENTIFYING THE DEGREE OF RISK AT A GRANULAR LEVEL

(71) Applicant: Dell Products L.P., Round Rock, TX (US)

(72) Inventors: Kapil Sampath, Cary, NC (US); Rahul Deo Vishwakarma, Bangalore (IN); Paul Hammer, Livermore, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/652,611

(22) Filed: Feb. 25, 2022

(51) Int. Cl.
*G06F 12/00* (2006.01)
*G06F 11/14* (2006.01)
*G06F 11/34* (2006.01)

(52) U.S. Cl.
CPC ...... *G06F 11/1451* (2013.01); *G06F 11/1461* (2013.01); *G06F 11/1466* (2013.01); *G06F 11/3409* (2013.01)

(58) Field of Classification Search
CPC ............. G06F 11/1451; G06F 11/1461; G06F 11/1466; G06F 11/3409; G06F 9/45533; G06F 3/065; G06F 3/0683
See application file for complete search history.

(56) References Cited

U.S. PATENT DOCUMENTS

| | | | |
|---|---|---|---|
| 6,516,425 B1 * | 2/2003 | Belhadj | G06F 11/1092 714/E11.034 |
| 2010/0250497 A1 * | 9/2010 | Redlich | H04L 63/105 707/661 |

* cited by examiner

*Primary Examiner* — Shawn X Gu
(74) *Attorney, Agent, or Firm* — Workman Nydegger (57) ABSTRACT

One example method includes gathering respective performance data concerning each asset in a group of assets, clustering the performance data so as to define a first cluster and a second cluster, and data assets in the first cluster are assigned a HIGH RISK label and data assets in the second cluster are assigned a LOW RISK label, assigning a respective risk score to each of the assets, and the risk score includes a quantified risk level for the asset to which the risk score has been assigned, ranking the assets with the HIGH RISK label according to their respective risk scores, and backing up a ranked asset based on an IO volume associated with that ranked asset.

20 Claims, 9 Drawing Sheets

FIG. 1

| | Application 1 | | | | Storage | | | | Network | Compute | |
|---|---|---|---|---|---|---|---|---|---|---|---|
| Time | Storage Hardware Age | IO Latency | IO throughput | Log error count | Disk Error count | IO ERRORS | Throughput Errors | Latency | Usage | Network Bandwidth | CPU Utilization | CPU Temperature |
| 4:00 PM | 95 | 53 | 34 | 90 | 20 | 55 | 51 | 84 | 84 | 88 | 22 | 68 |
| 4:05 PM | 50 | 100 | 95 | 6 | 64 | 91 | 32 | 82 | 50 | 74 | 85 | 100 |
| 4:10 PM | 26 | 48 | 53 | 16 | 12 | 72 | 64 | 63 | 64 | 2 | 63 | 83 |
| 4:15 PM | 100 | 12 | 89 | 95 | 88 | 19 | 12 | 44 | 6 | 83 | 39 | 1 |
| 4:20 PM | 29 | 4 | 10 | 34 | 72 | 92 | 75 | 6 | 9 | 76 | 48 | 68 |
| 4:25 PM | 82 | 70 | 20 | 12 | 89 | 76 | 30 | 22 | 29 | 85 | 92 | 35 |
| 4:30 PM | 53 | 95 | 63 | 64 | 81 | 64 | 20 | 70 | 51 | 55 | 13 | 52 |
| 4:35 PM | 82 | 93 | 41 | 98 | 39 | 53 | 5 | 10 | 57 | 33 | 75 | 21 |
| 4:40 PM | 22 | 56 | 3 | 31 | 51 | 50 | 11 | 54 | 75 | 25 | 20 | 21 |
| 4:45 PM | 98 | 26 | 33 | 53 | 68 | 38 | 3 | 46 | 79 | 14 | 85 | 8 |
| 4:50 PM | 76 | 73 | 0 | 10 | 74 | 72 | 33 | 35 | 34 | 99 | 24 | 33 |
| 4:55 PM | 63 | 40 | 59 | 89 | 100 | 15 | 46 | 93 | 6 | 29 | 39 | 39 |
| 5:00 PM | 55 | 77 | 95 | 0 | 49 | 94 | 49 | 95 | 58 | 70 | 61 | 94 |
| 5:05 PM | 37 | 7 | 77 | 48 | 98 | 50 | 53 | 16 | 53 | 67 | 27 | 15 |
| 5:10 PM | 69 | 65 | 96 | 86 | 52 | 28 | 74 | 10 | 84 | 55 | 44 | 1 |
| 5:15 PM | 2 | 24 | 1 | 74 | 20 | 62 | 87 | 90 | 75 | 87 | 80 | 38 |
| 5:20 PM | 74 | 46 | 56 | 61 | 96 | 28 | 31 | 21 | 14 | 6 | 94 | 41 |
| 5:25 PM | 2 | 94 | 78 | 46 | 66 | 9 | 72 | 90 | 88 | 32 | 23 | 11 |
| 5:30 PM | 83 | 37 | 64 | 14 | 30 | 98 | 34 | 24 | 57 | 12 | 6 | 21 |
| 5:35 PM | 91 | 52 | 23 | 74 | 64 | 1 | 29 | 87 | 1 | 96 | 86 | 68 |
| 5:40 PM | 70 | 37 | 66 | 49 | 2 | 19 | 39 | 19 | 90 | 62 | 13 | 26 |
| 5:45 PM | 46 | 36 | 27 | 38 | 27 | 93 | 77 | 97 | 44 | 87 | 20 | 82 |
| 5:50 PM | 91 | 28 | 30 | 41 | 70 | 36 | 41 | 48 | 51 | 86 | 49 | 70 |

FIG. 2

| Asset Serial Number | Status | Confidence (Risk Score) |
|---|---|---|
| Z305B2QN | HIGH RISK | 0.950820 |
| ZA16NQJR | HIGH RISK | 0.918003 |
| ZJV1CSVX | HIGH RISK | 0.868852 |
| ZA18CEBF | HIGH RISK | 0.737705 |
| ZJV02XWA | HIGH RISK | 0.672131 |
| ZJV0XJQ0 | HIGH RISK | 0.426230 |
| ZJV02XWV | HIGH RISK | 0.114754 |
| PL2331LAG9TEEJ | HIGH RISK | 0.098361 |

FIG. 3

| Risk Score | Application ID |
|---|---|
| HIGH | 65VF, OL91, VGH5, 871G, 241H |
| LOW | 6739, J984, 873J, LMN7 |

Let Y = ▨

$\alpha_A = \frac{3}{8} = 0.37$ $\alpha_B = \frac{4}{9} = 0.44$ $\alpha_C = \frac{7}{4} = 1.75$ $\alpha_D = \frac{7}{6} = 1.16$ $\boxed{\alpha_Y = \frac{3}{4} = 0.75}$ $p_{▨} = \frac{3}{5} = 0.6$ Let Y = ▨

$\alpha_A = \frac{5}{3} = 1.66$ $\alpha_B = \frac{5}{4} = 1.25$ $\alpha_C = \frac{4}{8} = 0.5$ $\alpha_D = \frac{6}{9} = 0.66$ $\alpha_Y = \frac{4}{3} = 1.33$ $p_{▨} = \frac{2}{5} = 0.4$ $p(\alpha_{n+1}^{y_p}) = \frac{\#\{i : \alpha_i^{y_p} \geq \alpha_{n+1}^{y_p}\}}{n+1}$ Lower p-value : Higher non-conformity

*Credibility* : $p_{max}$

*Confidence* : $1 - p_{max}^{2nd}$

LM7RQWD9 (Y)   LM7RQWD9 (Y)   *Confidence* = 0.6
*Credibility* = 0.6

FIG. 12

| Asset Serial Number | Status | Confidence (Risk Score) |
|---|---|---|
| Z305B2QN | HIGH RISK | 0.950820 |
| ZA16NQJR | HIGH RISK | 0.918003 |
| ZJV1CSVX | HIGH RISK | 0.868852 |
| ZA18CEBF | HIGH RISK | 0.737705 |
| ZJV02XWA | HIGH RISK | 0.672131 |
| ZJV0XJQ0 | HIGH RISK | 0.426230 |
| ZJV02XWV | HIGH RISK | 0.114754 |
| PL2331LAG9TEEJ | HIGH RISK | 0.098361 |

INTELLIGENT PROTECTION OF VIRTUAL MACHINE BY IDENTIFYING THE DEGREE OF RISK AT A GRANULAR LEVEL

FIELD OF THE INVENTION

Embodiments of the present invention generally relate to data protection. More particularly, at least some embodiments of the invention relate to systems, hardware, software, computer-readable media, and methods for performing a data protection process based at least in part on a volume of IO (input/output) operations of an application that uses the data.

BACKGROUND

Enterprises typically require the performance of so-called application-consistent backups, or 'app-consistent' backups, to protect the data of the enterprise. Such backups may help to ensure that all the data for an application or service is both protected, and recoverable. In practice, the backup entity that will be backing up the data may pause any new requests for the data, and may also flush any caches and buffers used by the application, in order to ensure that all the data is captured for backup. After the backup has been completed, new requests for data will be begin to be processed again.

Such application-consistent backups may provide a high level of protection and consistency for the data since they may operate to capture all the data which is on the disk and in the memory. In most of the cases, these will be scheduled backups which will run at some particular time. Particularly, the app-consistent backups may be run at some time as scheduled by the backup administrator. App-consistent backups may be scheduled in this way, for example, to reduce backup resource contention and to ensure adequate resources are available to support the backup operations. However, this approach to performing app-consistent backups presents some problems.

Consider, for example, a scenario where a huge IO operation happened in the application server, such as in an Oracle server, MS SQL server, Exchange server, SharePoint server, or involving a group of application VMs (virtual machines). Suppose, however, that there are still many hours before performance of the scheduled backup of the server where those IOs took place. In this scenario, if the application server should go down before the scheduled backup can be completed, there will be a huge data loss due to the large volume of IOs involving the application server. That is, because the scheduled backup of the application server was not started prior to the application server going down, there is no chance of recovering the new and modified application server data that resulted from the large volume of IOs.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data protection. More particularly, at least some embodiments of the invention relate to systems, hardware, software, computer-readable media, and methods for performing a data protection process based at least in part on a volume of IO (input/output) operations of an application that uses the data.

In general, example embodiments of the invention may implement an intelligent approach to identify the IO proportionality of an application for the automated triggering of a backup of application data based on the overall health/risk score of the application. The app-consistent backup may be initiated automatically by the backup software whenever a huge load of IO operation happens on the application server. The backup product, which may be hosted on the application server, or elsewhere, may operate to detect the IO operations or changes done in the application server. If there is huge change—consider the change of 50% in the app-consistent VM, then the backup of the data will be triggered automatically by the backup product on the application server, thus ensuring the critical huge IO data is protected without waiting for a scheduled backup to run.

In more detail, example embodiments may approach the problem of loss of IO data as a machine learning problem, and may consider the IO proportionality of the application being protected as a factor in determining when to perform a backup of application data. Further, example embodiments may also consider the health of the application, whether the application is physical or virtual, in determining when a, possibly unscheduled, backup of application data should be performed.

To illustrate with an example, in an enterprise data center, there may be multiple applications running that perform various functions relating to content and/or administration of the datacenter. Maintaining the reliability of, and protecting, each application, data, and devices is needed to ensure the functioning of the datacenter. Example embodiments may identify one or more applications which may be deemed to be in greatest need of attention by the administrator for continuous availability to a customer and/or to an enterprise. Such applications may include, but are not limited to, physical applications such as Oracle, MS SQL, Exchange, and SharePoint, as well as virtual applications hosted by one or more VMs. The example embodiments may then assign a health score to one or more of the applications by understanding the overall risk score associated with a potential loss of data associated with those applications and, based on the health score and/or risk score, embodiments may then perform an automatic backup of the application and data identified as high risk. This automatic backup may be an unscheduled backup, and may be performed prior to a next scheduled backup.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that an asset may be protected based on considerations other than the normal backup schedule for that asset. An embodiment may take into consideration an expected, and/or observed, IO volume of an asset in determining whether that asset should be protected prior to the time of performance of a first, or next, regularly scheduled backup for the asset. Various other advantages aspects of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Figure 1:
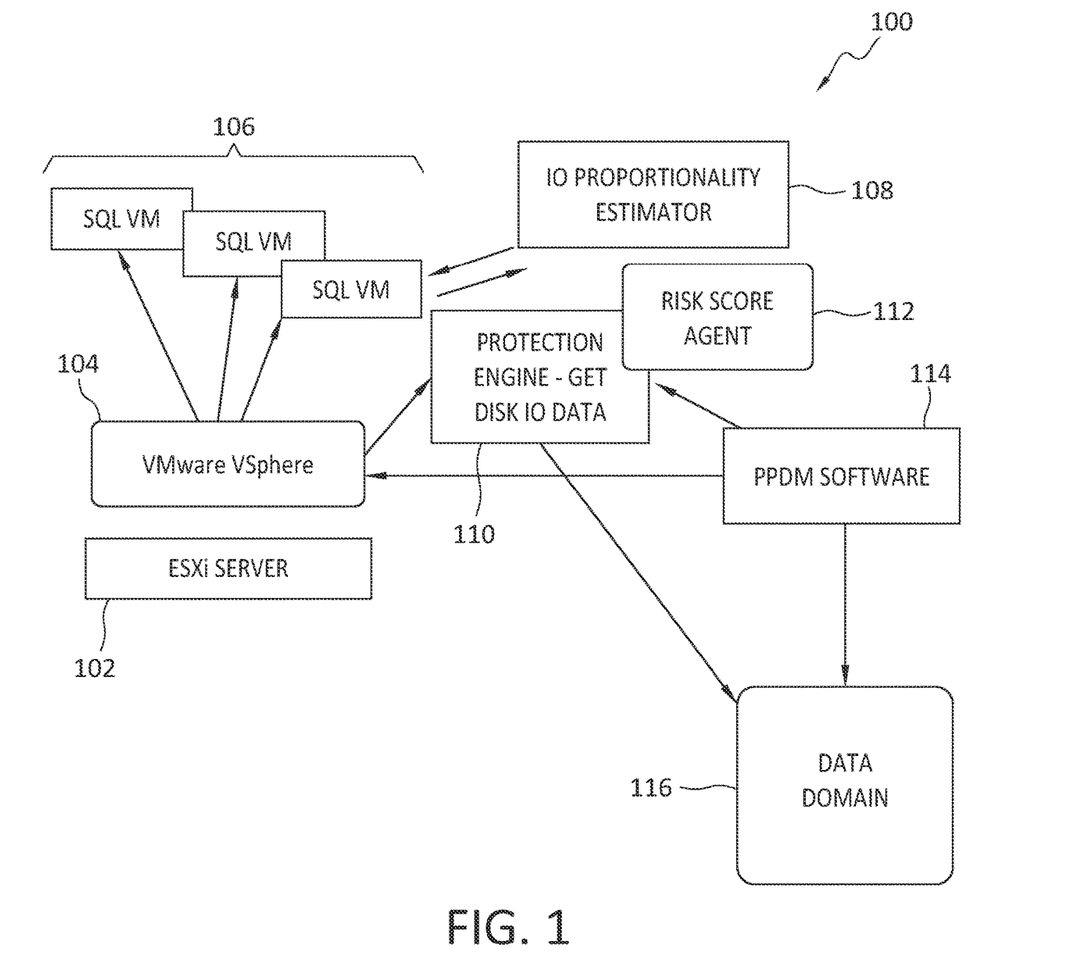
FIG. 1 discloses aspects of an example operating environment and architecture according to some embodiments.

With particular attention now to FIG. 1, one example of an operating environment for embodiments of the invention is denoted generally at 100. In general, the operating environment 100 may include a hypervisor 102, such as a VMware ESXi server for example, that controls the operation of a server virtualization platform 104, such as VMware VSphere for example. The server virtualization platform 104 may comprise a management platform, one example of which is VMware vCenter, that may operate to manage, from a central location, control plane entities in a virtual environment such as ESXi servers, virtual machines, virtual networks, and datastores. In the example of FIG. 1, the server virtualization platform 104 may virtualize a SQL server as a series of VMs 106, such as SQL VMs for example, that each perform the functions of a SQL server. Note that while FIG. 1 discloses virtualized servers and applications, the scope of the invention is not so limited. Rather, example embodiments may additionally, or alternatively, be employed with physical applications hosted physical servers.

With continued reference to the example of FIG. 1, the operating environment 100 may comprise an IO proportionality estimator 108 which, in general, may operate to make an estimate as to a volume of IOs expected at an application server. The IO proportionality estimator 108 may comprise an ML (machine learning) model which, in some embodiments at least, is able to estimate expected IO volume based on actual IO information obtained by a protection engine 110. In some embodiments, the IO proportionality estimator 108 may be incorporated into the protection engine 110, but that is not required.

A risk score agent 112, which may be incorporated into the protection engine 110 in some embodiments, may operate to generate respective risk scores for one or more application servers, which may be physical servers and/or virtual servers. The risk scores may be used as a basis, for example, for identifying whether a server, or servers, are at risk for some reason and, as such, should be protected by a backup operation performed outside of a regular backup schedule for the server(s).

Finally, in the example of FIG. 1, backup operations directed to assets such as the VMs 106, for example, may be defined and implemented by a backup platform 114 that hosts a backup application, such as DellEMC PPDM (Power Protect Data Manager) for example. The backup data generated by the backup platform 114 may be stored in a suitable storage environment 116, such as the DellEMC DataDomain environment for example.

B. Detailed Aspects of Some Example Embodiments

Following is a detailed discussion of aspects of some example embodiments. These include data collection, application server classification, application server health ranking, and a method and pseudocode according to some example embodiments.

B.1 Data Collection

Figure 2:
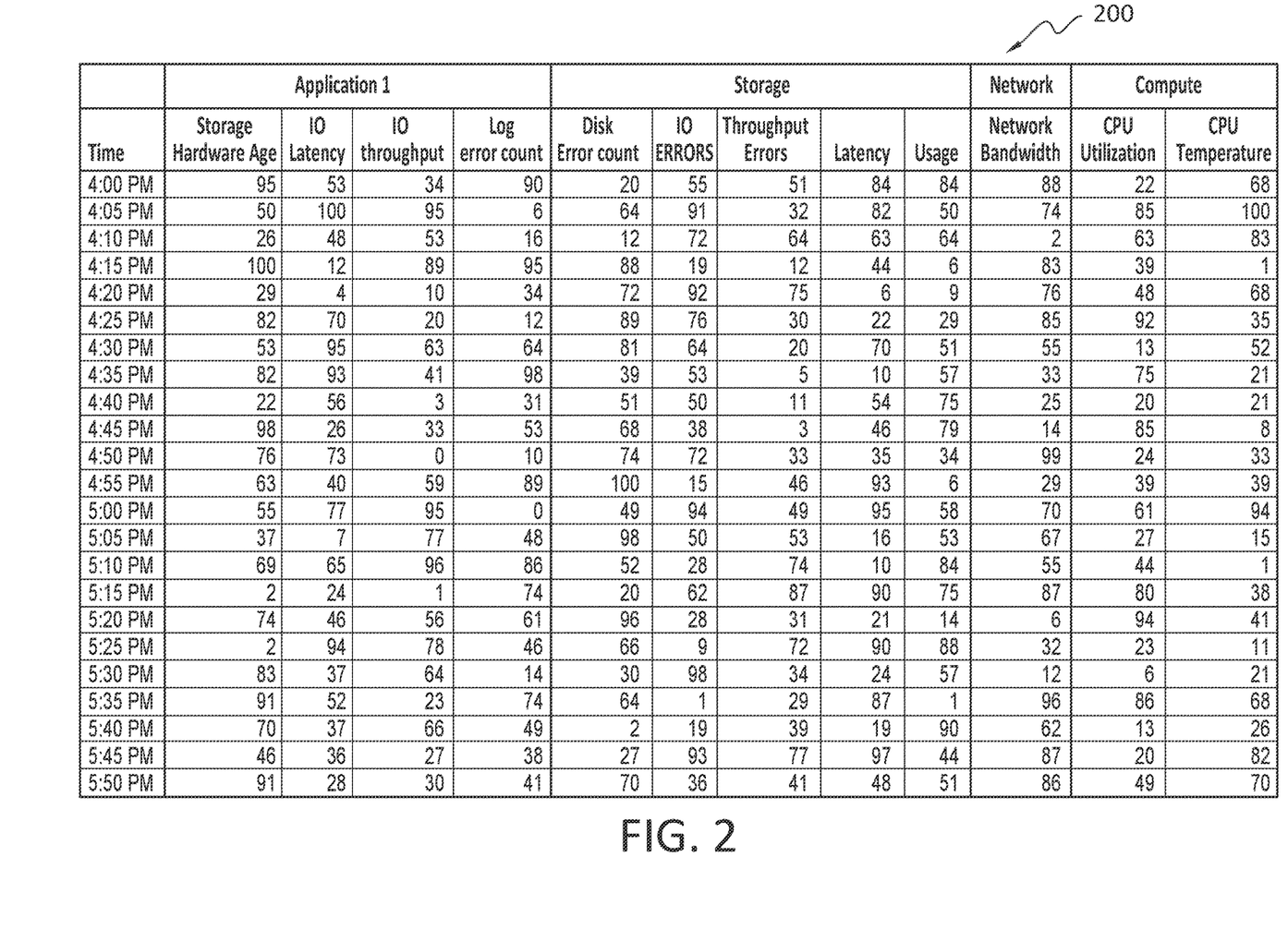
FIG. 2 discloses aspects of an example asset dataset collected according to some embodiments.

In general, data collection operations according to some embodiments comprise collection of performance data for each available application, and also collecting data regarding the underlying storage, and network and compute utilization, by the application. FIG. 2 discloses an example dataset 200 that includes performance, and other, data.

As shown in FIG. 2, the collected data may be organized by time of collection, and may include, but is not limited to, application data such as the age of the hardware used to store that data, the IO throughput for the application, and a log of error counts for the application. The collected data may comprise various data concerning parameters of the performance of the storage when storing the application data, such as, but not limited to, disk error counts, IO errors, throughput errors, latency, and usage. The collected data may comprise data concerning one or more network parameters, such as network bandwidth used by the application and/or available for use. Finally, the collected data may include data concerning computing resources consumed by the application. Such data may include, for example, CPU utilization by the application, and CPU temperature.

After the data, such as the example data in the dataset 200, has been collected, the data may then be clustered. Some example embodiments may employ a density-based clustering technique to obtain a labeled dataset. In general however, any other ML algorithm, with acceptable time complexity, may be used to cluster the data. The density-based approach to data clustering that may be taken in some embodiments may be advantageous in some circumstances in that it may take advantage of both hierarchical and density based, that is, non-parametric, clustering techniques.

Regardless of the clustering approach employed, some embodiments may, as discussed below, cluster the data in such a way as to create two clusters of data, namely, a 'high risk' cluster, and a 'low risk' cluster. Data points in the 'high risk' cluster may be labeled 'HIGH' and data points in the 'low risk' cluster may be labeled 'LOW.'

B.2 Asset Classification

As discussed above, and in further detail elsewhere herein, a determination may be made as to whether an asset, such as an application server for example, is 'high risk' or 'low risk,' and the degree of risk for the asset may be quantified. Thus, embodiments may translate or convert the collected data concerning an asset into a binary classification problem in which an asset is labeled either 'HIGH' or 'LOW.' A classification model used to label the assets may employ a conformal prediction approach, although the scope of the invention is not limited to any particular classification model.

Figure 3:
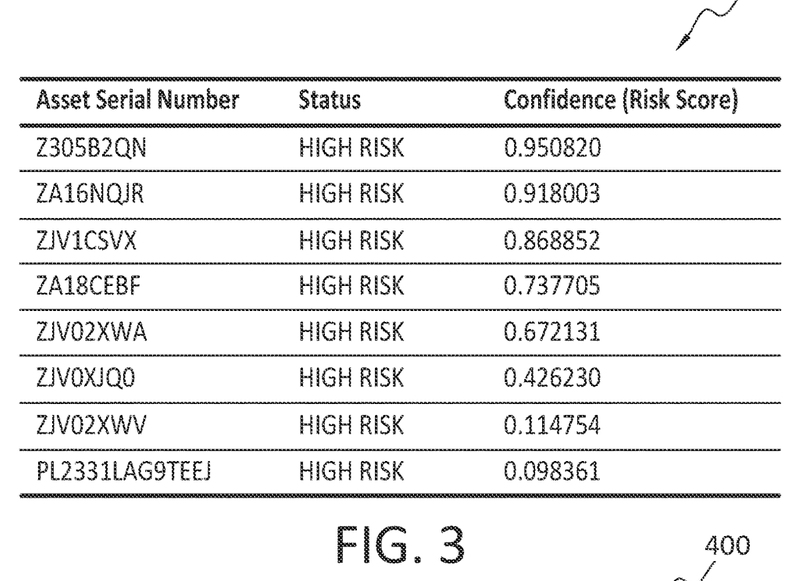
FIG. 3 discloses an example table that ranks HIGH risk assets by their respective confidence score.

With reference now to FIG. 3, a table 300 is disclosed that includes asset classifications, and corresponding risk scores, such as may be generated by example embodiments. The details concerning example algorithms operable to generate data are disclosed elsewhere herein. In general however, the example table 300 includes a prediction output for each Asset ID, that is, the prediction output is whether the asset should be classified as 'HIGH' risk or 'LOW' risk, and a corresponding confidence level, or 'Risk Score' in the table 300, that the prediction is correct. Thus, example embodiments may operate to, among other things, (1) assess the risk that data associated with the asset is subject to possible loss, (2) determine a confidence level, or risk score, that reflects a confidence level in the assessment (1), and (3) rank the assets, such as the 'HIGH' risk assets, from highest risk score to lowest risk score.

Note that there may be no need to rank the 'LOW' risk assets since those assets may be adequately protected simply by backing them up according to an established backup schedule. Note also that where a confidence level in a risk assessment falls at or below a specified threshold, example embodiments may provide for collection of more and/or different data about that asset in order to be able to assign, with at least a minimum acceptable amount of confidence, a status to that asset. For example, while the asset with serial number PL2331LAG9TEEJ in the table 300 has been assessed as 'HIGH' risk, the confidence that such assessment is correct is low at 0.098361. This low confidence level may suggest, for example, that the data upon which the assessment was based is faulty in some way. The low confidence level may correspondingly support an inference that while the asset has been labeled 'HIGH' risk, the risk of data loss associated with that asset may, in fact, not be 'HIGH.' Thus, in some embodiments, an asset having an assessed risk level—such as 'HIGH' for example—with low confidence, such as below a specified threshold, may be relabeled, possibly automatically, as having a different risk level—such as 'LOW.'

Figure 4:
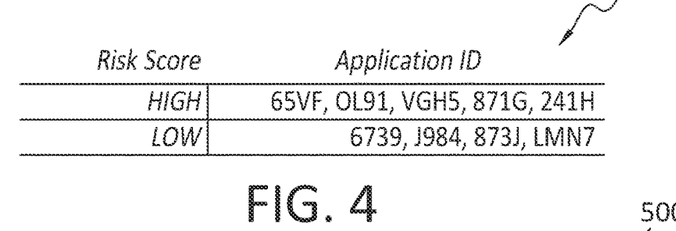
FIG. 4 discloses an example table that groups assets according to their risk score.

With reference briefly to FIG. 4, at table 400 is disclosed that includes 'HIGH' and 'LOW' asset groupings. Particularly, the table 400 indicates application ID information for all applications with a 'HIGH' risk score, as well as application ID information for all applications with a 'LOW' risk score. In some embodiments at least, the information in tables 300 and/or 400 may be presented to a user by way of a UI (user interface) such as a GUI (graphical user interface), or CLI (command line interface).

B.3 IO Volume-Based Backup

As noted earlier, embodiments of the invention may employ application 10 volume as an indicator to determine if an application server, which may be physical or virtual, that hosts the application should be backed up sooner than planned. To illustrate, DISK I/O values for a VM may be gathered by a protection engine 110 (FIG. 1) from the server virtualization platform 104 (FIG. 1). Specifically, the protection engine 110 may poll the DISK IO parameters of the protected VM or other application platform, and obtain the DISK IO details of all the protected VMs. In some embodiments, disk IO values may be measured in IOPS (IO operations/second).

Figure 5:
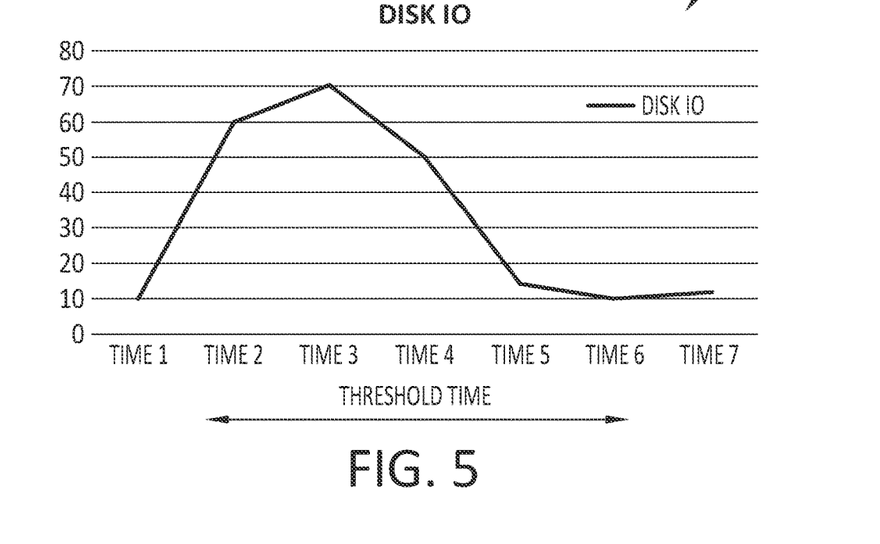
FIG. 5 discloses a graph of IO volume over time.

With reference now to FIG. 5, an example threshold estimator 500 for a backup window is disclosed. As shown in the example of FIG. 5, the IO volume increases significantly from Time 1 to Time 3, after which the IO volume continues to be relatively high, but begins decreasing, and has decreased to Time 1 volume by Time 5. Thus, the IO volume plot in FIG. 5 may suggest that a backup of the asset to which those IOs were directed should begin at, or near, Time 5. In this way, the high volume of IOs may be backed up prior to the time set for a regularly scheduled backup of the asset. Thus, if the asset were to experience a problem at, for example, Time 7, some or all of the disk IOs may already have been backed up, thus preserving those IOs from loss that may otherwise have resulted if the asset experienced a problem prior to performance of a regularly scheduled backup of the asset.

Following is an example of pseudocode operable to implement an IO volume-based approach to protection of an asset, such as by protecting data and/or applications of the asset.

START

Given: Time 1—Time when last scheduled backup is completed.

DO:

DISK IO parameters and health risk of the virtual machines are captured by dedicated analytics engine.

CASE:

IF:

Suppose from Time 1 to Time 5, the IO operation rate is greater than threshold value of say 50% IO (user defined threshold)

AND

Time (Time1 to Time 5)==threshold value

//thresholds say 1 hour

THEN:

Protection Engine should intimate Broker engine to trigger Auto-Backup of Application (for example SQL VM (Full or incremental)).

DO:

Initiate auto-backup at Time 5 and validate the completion status.

STOP

D. Example Methods

Figure 6:
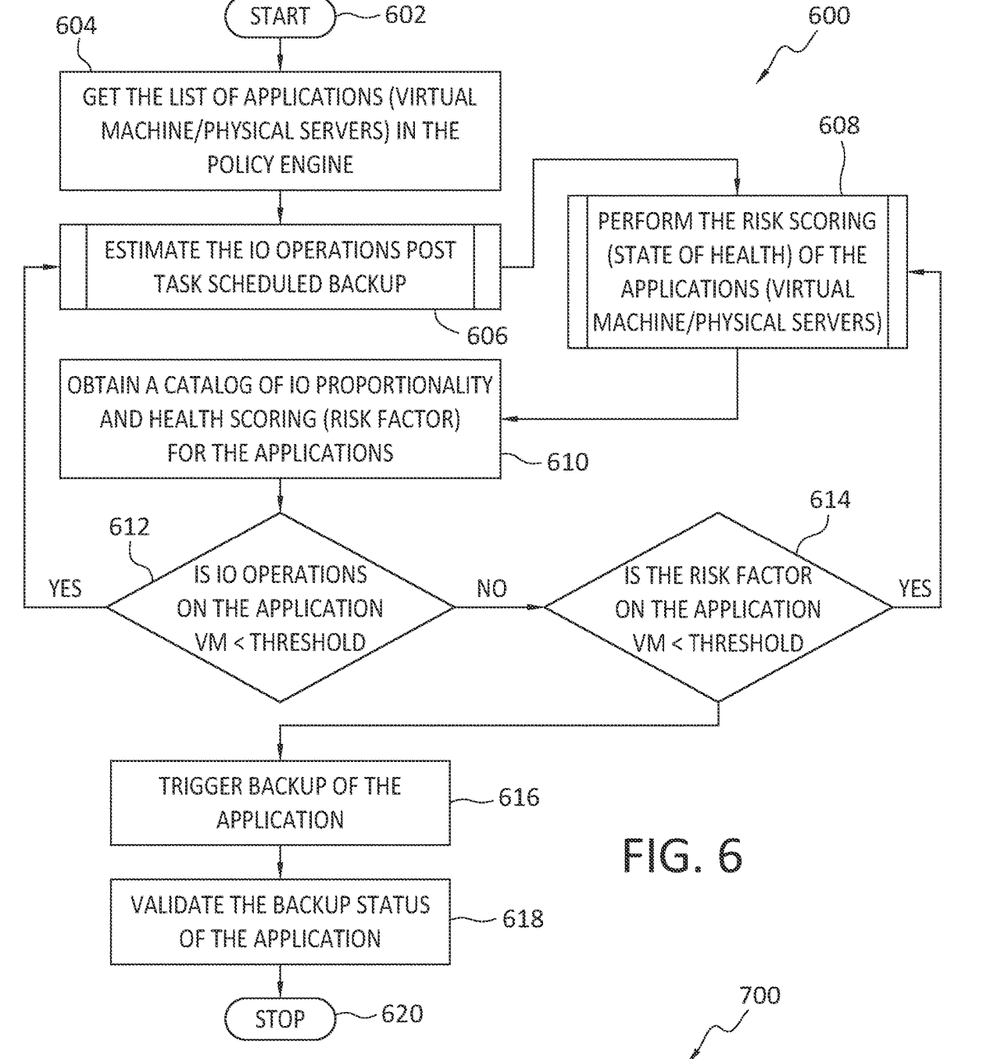
FIG. 6 discloses an example method according to some embodiments.

It is noted with respect to the disclosed methods, including the example method of FIG. 6, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 6, an example method 600 according to some embodiments is disclosed. After the method 600 has started 602, a list of assets, such as applications for example, in a backup policy engine may be obtained 604. In general, the applications may be listed due to their conformance with a backup policy which may require, for example, that if the application experiences a particular IO volume over a certain period of time, the data resulting from those IOs should be backed up starting immediately after the IO volume has declined, such as to a specified level, rather than being backed up at a later time specified by a normal backup schedule.

Next, an estimate may be generated 606 of IOs expected to be directed to the asset after the time when a regularly scheduled backup is set to start, or complete. This estimate may then be used to perform a risk scoring 608 of the asset. Further, a catalog of IO proportionality and health scoring for the asset may be obtained 610.

A check 612 may then be performed to determine if the estimated IO operations (see 606) for the application are less than a threshold number of IO operations. The threshold may be determined, possibly using an ML model, based on past experience, or may be arbitrarily selected by a user, for example. If the estimated IO operations are determined 612 to be less than the threshold, the method 600 may return to 606.

On the other hand, if the estimated IO operations are determined 612 to exceed the threshold, the method may advance to 614 where a further check is performed to determine if the risk factor for the application is less than a threshold risk factor. If the risk factor is less than the threshold risk factor, the method 600 may return to 608. If the risk factor is equal to, or greater than, the threshold risk factor, a backup of the asset may be triggered 616. After completion of the backup, the backup status of the application may be validated 618, and the method 600 then terminated 620.

E. Aspects of Some Example Use Cases

In general, example embodiments may take various approaches to protecting an asset when certain IO volume and risk factor considerations are met. The following two examples are provided by way of illustration and are not intended to limit the scope of the invention in any way.

E.1 Example Approach No. 1

In this illustrative example, backup re-prioritization specified by a policy of a policy engine may be based on the availability of the backup sessions. For the purpose of this example, it is assumed that there are multiple different policy engines, and multiple different applications being protected by a protection engine that is operable to perform backup operations and store backups in a backup storage server.

Given this background, suppose that the system receives a high inflow of IOs on a specific asset, such as an application, application server, or VM, at time T-X, while the scheduled backup is set to start later, at time T, how should a data manager behave? Further, what if the asset is not in good health, that is, the asset has a relatively high risk score, should a backup of that asset be triggered so that at least the data that existed at the time of that backup will be saved?

If the assets in question in this example are VMs, such as VM1 and VM2, they may or may not be covered by the same backup policy. In any event, in this example: IF: VM1 is considered as healthy and has an IO volume greater than VM2, which is unhealthy, that is, VM2 has a relatively higher risk score than VM1.

THEN:
  Priority will be to backup VM2, and the $2^{nd}$ priority for backup will be VM1
  Estimate the backup sessions available to support backups of both VM1 and VM2,
  AND
  IF enough backup sessions are available:
  DO: Trigger parallel backup of both VM1 and VM2 (no prioritization required)
ELSE:
  Wait for the free available backup session and run the backup as per the prioritization based on the IO proportionality and health risk score of the application.

E.2 Example Approach No. 2

This illustrative example may be directed to achievement of this goal: if a backup policy is overridden, and there is high inflow of primary IO and network usage, the proposed approach will embrace the incoming IO impact and stabilize the system using point (1), discussed below. In general, this approach may involve backup channel reservation when the backup mechanism is triggered. Particularly, this approach may comprise these elements: (1) reserve some backup sessions for the backups triggered by the backup mechanism according to example embodiments; (2) provide a user configurable option in the backup platform, such as PPDM for example, to reserve a number of backup sessions for this purpose; (3) set the default number of reserved backup sessions to 1 session, and enable the user to configure and modify this value; and (4) when a high priority backup is triggered due to predicted hardware failure on an asset such as one of the application VMs, assurance may be had that there are backup sessions available to perform the immediate backup. In some embodiments at least, these reserved sessions may be exclusively used for backups triggered by the disclosed backup mechanism only if there are no free backup sessions available. In this way, embodiments may ensure the backup of high priority VMs recommended by this algorithm.

F. Further Discussion

As will be apparent from this disclosure, example embodiments of the invention may provide various useful features and functionalities. For example, embodiments may provide a mechanism to automatically protect an asset in an enterprise data center for zero data loss. As another example, embodiments may operate to assign asset risk scores based on a transductive confidence machine framework, that is, a learning framework which is algorithm agnostic and can be used as a wrapper over any ML algorithm. This may include providing a nonconformity score for a risk classifier algorithm. Further, example embodiments may provide optimally running agents that may operate to perform continuous health checks of an application or other asset. The agents, which may reside on a protection engine, may collect, on a relatively frequent basis, health information from assets which are relatively unhealthy. Health checks may be performed less frequently, by the agent, on relatively healthy assets. This approach to health check performance may save overall unnecessary compute operations that would otherwise be performed if health checks were performed, for example, on an "all application" basis in the data center. As a final example of features and functionalities, some embodiments may operate to perform smart auto backup of application VMs, which may help in protecting high volume, and important, IO data without waiting for the scheduled backups to run. This approach may ensure the highest level of protection to the application VMs and, thus, the data may be safe and secure.

Example embodiments may be employed in a variety of contexts. For example, embodiments may be employed to protect data in connection with a data backup manager, such as PPDM for example, that may support file system, database, VMs and k8s for backup. Particularly, disclosed embodiments may help to protect the customer data and assets by overriding the default backup policy before any impediments transpire with regard to the asset to be protected.

Regardless of the context, example embodiments may provide an analytics dashboard implementation on the backup application. For example, embodiments may provide analytics on a PPDM dashboard indicating how many times the disclosed data protection mechanism triggered an on-demand backup. This metric may demonstrate to customers the value added by the data protection mechanism in minimizing customer data loss.

Further, embodiments may provide for metadata based audit logs. Particularly, embodiments may add a label to the backup metadata such as, for example, "backup triggered by intelligent protection," and the labeled metadata saved to a storage platform, such as DataDomain (DD) for example. So, whenever a customer, engineering department, or other entity, wants to run a report on how many times a particular VM was protected by this intelligent protection provided by example embodiments of the invention, they will be able to run a query and search for this label. This information may thus provide insights as to how healthy or how overloaded an application VM is, and may enable a user to modify, for example, the VM load/config based on that information.

As a final example, embodiments may provide for validation of the backup status of an asset, such as an application for example. Particularly, it is possible that a backup, such as may be triggered by some example embodiments, might fail either because the application is over-loaded, or the application is not healthy. In such cases, embodiments may trigger a special alert on the dashboard indicating "backup by intelligent protection failed" and the name of the VM whose backup failed. Such a message may indicate to the customer that this is not a normal backup failure and may be due, instead, to some health issue or IO load, for example, on the VM, which should be addressed by the customer.

G. Asset Classification and Ranking

As noted herein, an asset may be classified as LOW risk or HIGH risk, and may also be assigned a corresponding risk score that may be used as in input to a process for determining if, and when, an asset should be protected. Further details are now provided concerning some example methods and operations for asset classification. Initially, there is provided an overview of how embodiments of the invention may leverage the intelligence from the algorithm, and translate the algorithmic inference, to identify any high-risk assets, such as VMs for example.

G.1 Overview

Suppose an operating environment has 10 assets {A, B, C, D, E, F, G, H, I, J} and desired data, such as performance statistics and error logs for example, is being collected for each asset, and an administrator would like to classify, in a binary fashion, which assets are performing well, and which assets are not performing as expected and, as such, may be designated as HIGH risk.

A machine learning technique may then be used to obtain the output:

(10−N)={A, C, D, E, F, G, I} Healthy Assets

N={B, H, J} High-Risk Assets

For an administrator N (3), that is, {B, H, J}, may have equal importance, and an equal likelihood of being at high-risk. Suppose that the machine learning technique has identified N=50 assets to be in a HIGH status, that is, high-risk. In a case such as this, with so many assets involved, it may be quite challenging for an administrator to prioritize which 'HIGH' asset to take care of first. Further, a situation may arise where when asset N-35 is being protected, such as by a data protection operation, and at the same time, asset N-14 experiences a reduction in health. This situation likewise presents a challenge for the administrator who may have to decide whether to slow or stop the protection of N-35 and begin protecting N-14 before the health of N-14 declines even further.

Figure 7:
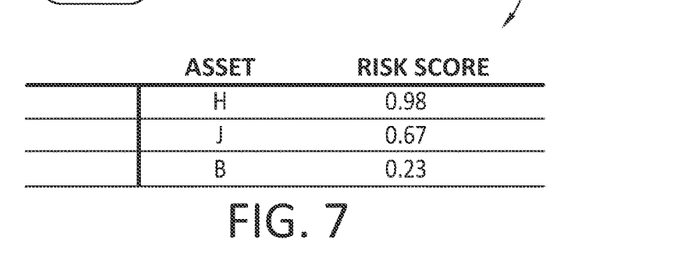
FIG. 7 discloses an example table listing various assets according to risk score.

As illustrated by the scenarios just described, there is a need to be able to prioritize the high risk assets for protection. Particularly, and with reference to the example catalogue 700 of FIG. 7, it would be useful to be able to rank a group of HIGH assets by respective risk scores that quantify the relative risk level for each of the assets. Using such a catalogue may enable an administrator to prioritize which HIGH asset needs to be protected first. Thus, in the example of FIG. 7, asset H will be protected first, possibly by the triggering of a backup operation, and thereby overriding an existing backup policy that applies to H, and asset B will be the lowest priority, as among the listed assets, for protection. Further details concerning an example approach for risk score calculation are provided below.

Some example embodiments may employ and algorithmic implementation for calculating a risk score. In this regard, it is noted that most of the algorithms for binary classification operate to output a point prediction, as illustrated below.

Input: $(x_1, y_1), (x_2, y_2), (x_n, y_n) \ldots (x_{n+1}, y_{n+1}=?)$

Task: Predict label of $(y_{n+i})$ new data point

Prediction model: $f(x_i) \to (y_i)$

Example embodiments may use this approach, or any other classification algorithm, to quantify the uncertainly of each prediction label, which may then be translated into a risk score. Thus, while some embodiments may employ the k-NN (k-Nearest Neighbor) classification algorithm, example embodiments may be agnostic as to the particular classification algorithm that is employed. Moreover, embodiments are directed to methods that enable identification of a particular level, or degree, of risk for an asset and, as such, embodiments generate risk scores at a more granular level as compared with, for example, an simplistic approach that only identifies an asset as HIGH risk, or LOW risk.

Figure 8:
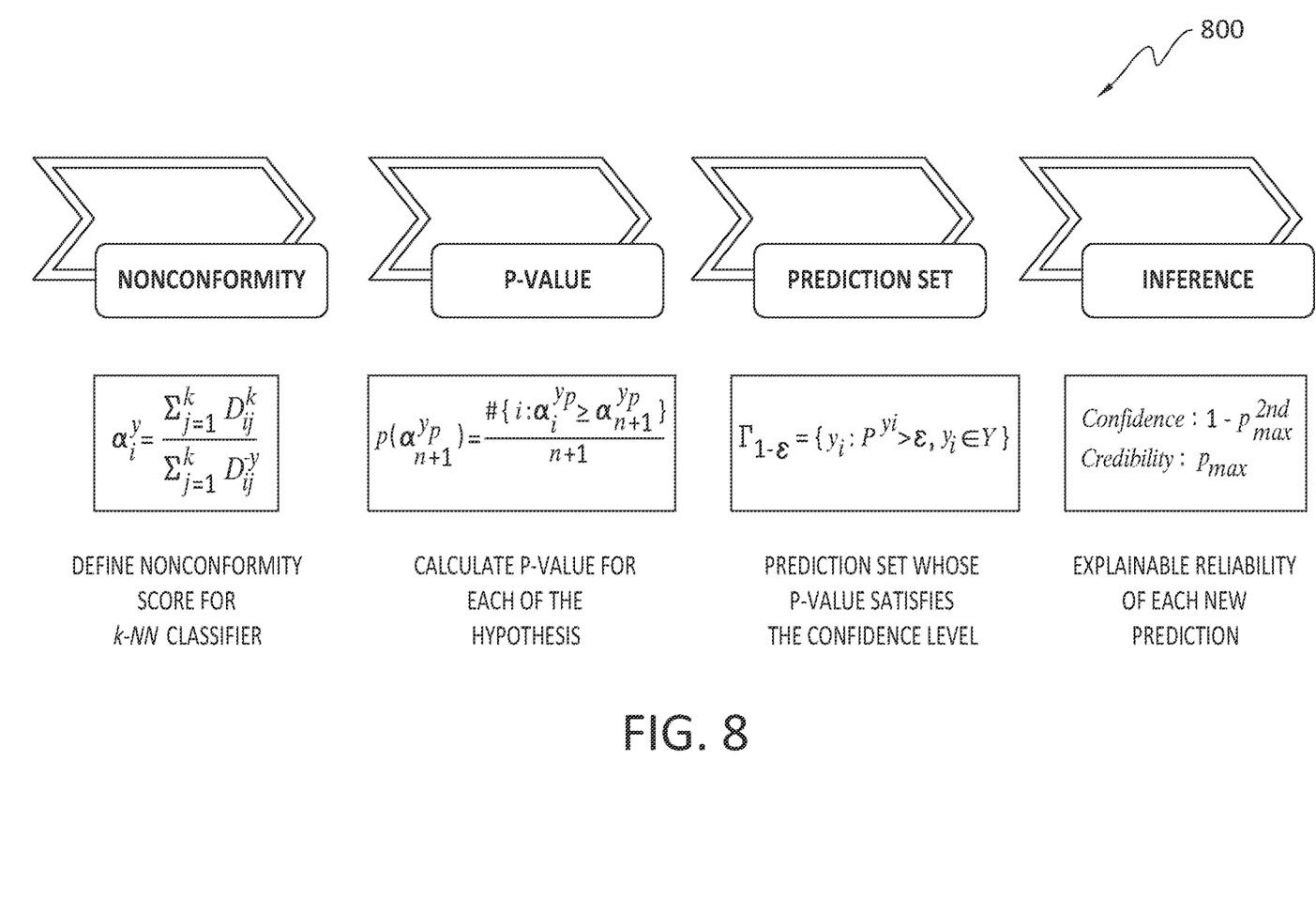
FIG. 8 discloses an example framework, according to some embodiments, for determining a nonconformity score, p-value, prediction set, and inferences.

With reference now to FIG. 8, an example framework 800 is disclosed for generating an uncertainty quantification for each label, that is, HIGH or LOW, prediction. In general, the framework 800 may embody algorithmic randomness, or the problem of assigning confidences to predictions, which may be closely connected to the problem of defining random sequences. The framework 800 may also involve hypothesis testing.

Figure 9:
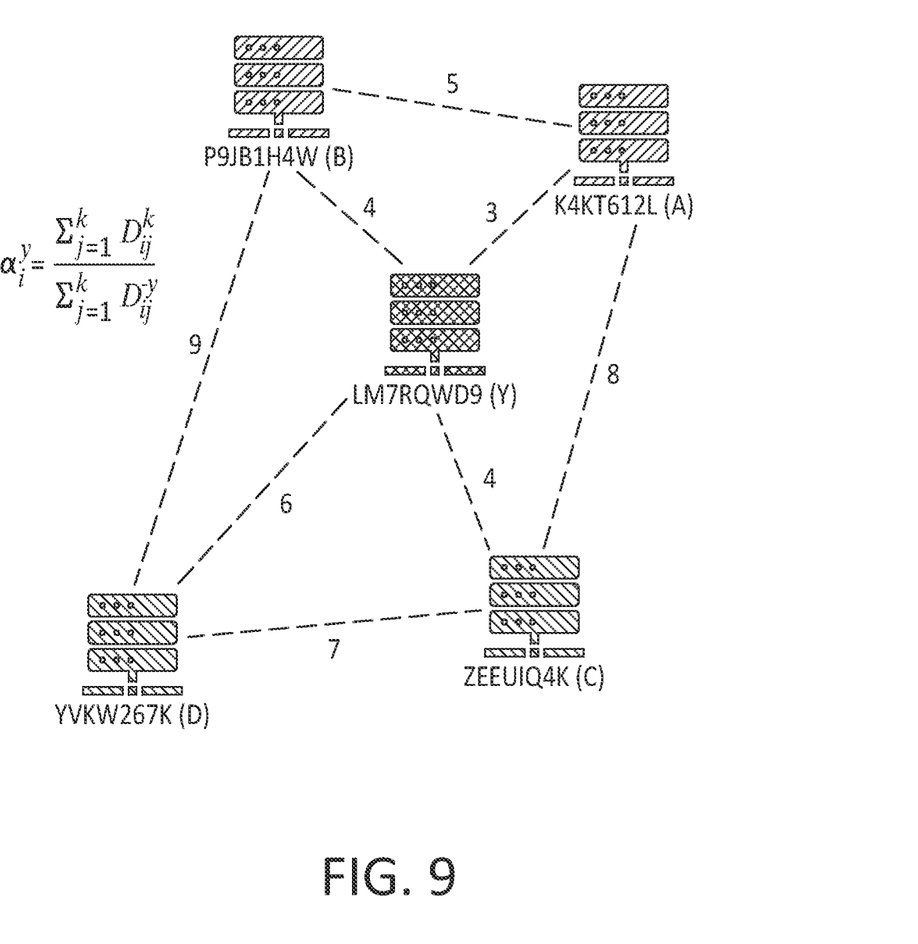
FIG. 9 discloses an example grouping of HIGH and LOW assets, and including an unclassified asset.

Turning next to the example of FIG. 9, and given an asset dataset, such as a dataset generated by an application hosted at a VM, embodiments may approximate a label {Healthy or Low-Risk, Unhealthy or High-Risk} of an asset at some future time (t+n) and assign a confidence, using an uncertainty quantifier, to the approximated label, where embodiments may use a k-NN classifier (k=1). In the particular example of FIG. 9, assets A and B have been at least initially identified as unhealthy, or high risk, and assets C and D have been at least initially identified as healthy, or low risk. Given this information, the task becomes one of at least approximating the label, that is, HIGH or LOW, for asset Y.

In some embodiments, approximating the label may be performed by obtaining a non-conformity score of both the labels using hypothesis testing and comparing the asset Y to assets A/B (unhealthy) and to assets C/D (healthy). In general, a non-conformity score, or its inverse, a conformity score, quantifies an extent to which an asset is similar/dissimilar with respect to one or more neighboring assets. Thus, a respective non-conformity score may be assigned to an asset for each neighbor, or adjacent asset, of that asset.

The lowest of the two non-conformity scores may be used as the basis for assigning a label to the asset Y. That is, asset Y may be assigned the same label as the assets A/B or C/D to which asset Y is determined to be most similar. In the example of FIG. 9, a non-conformity score is shown between each pair of adjacent assets. Thus, for example, the non-conformity score between unhealthy assets B and A is relatively low at 5. On the other hand, the non-conformity score between unhealthy asset A and healthy asset C is relatively high at 8.

Figure 10:
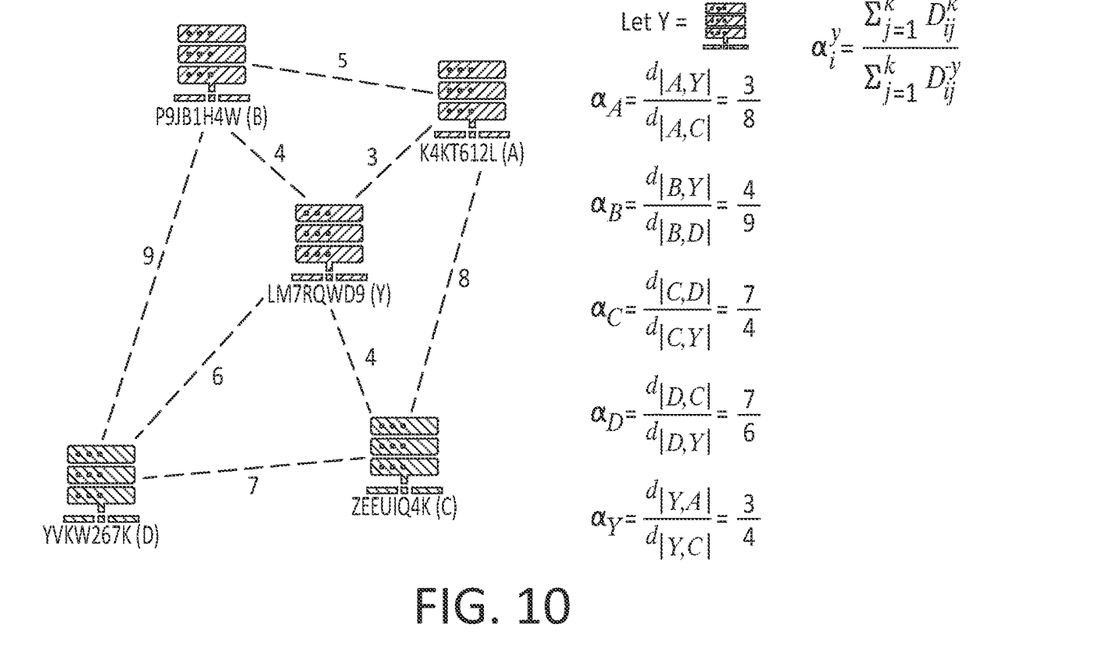
FIG. 10 discloses use of a hypothesis 'A' for determining a non-conformity score of an asset, assumed to be unhealthy, according to some embodiments.
Figure 11:
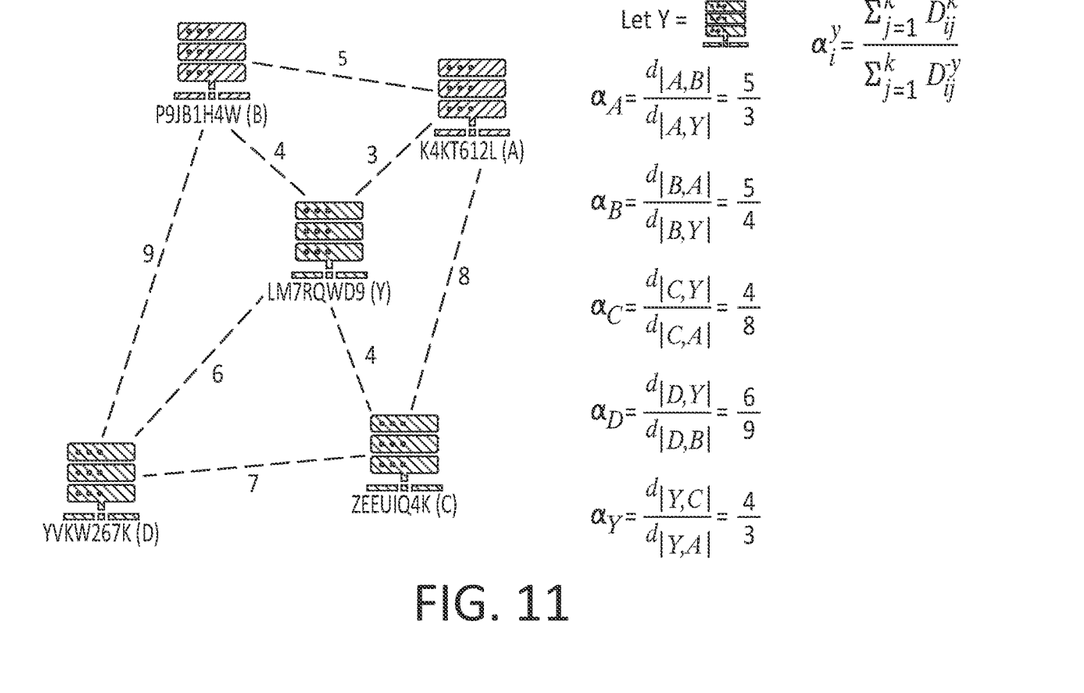
FIG. 11 discloses use of a hypothesis 'B' for determining a non-conformity score of an asset, assumed to be healthy, according to some embodiments.

With reference now to FIGS. 10 and 11, an approach, according to some example embodiments, is disclosed for determining a non-conformity score for the asset Y. In general, this approach may involving alternatively assuming that the predicted label or score for the asset Y is high-risk (unhealthy), and that the predicted label or score for the asset Y is low-risk (healthy), and then performing further operations, detailed below, to ultimately assign a label to asset Y.

With reference first to FIG. 10, a hypothesis A assumes that the predicted label for asset Y is high-risk, as has been established with respect to assets A and B. Given this assumption, a respective non-conformity score may then be calculated for asset Y with respect to each neighbor of asset Y. In the example of FIG. 10, those neighbors are assets A, B, C, and D. The formula for calculating the non-conformity scores a is shown in the upper-right portion of FIG. 10.

An approach similar to that taken in FIG. 10, is taken in FIG. 11. The difference in FIG. 11 is that the asset Y is assumed to be healthy, rather than unhealthy as was assumed in FIG. 10. The formula for calculating the non-conformity scores a in FIG. 11 is shown in the upper-right portion of FIG. 11.

Figure 12:
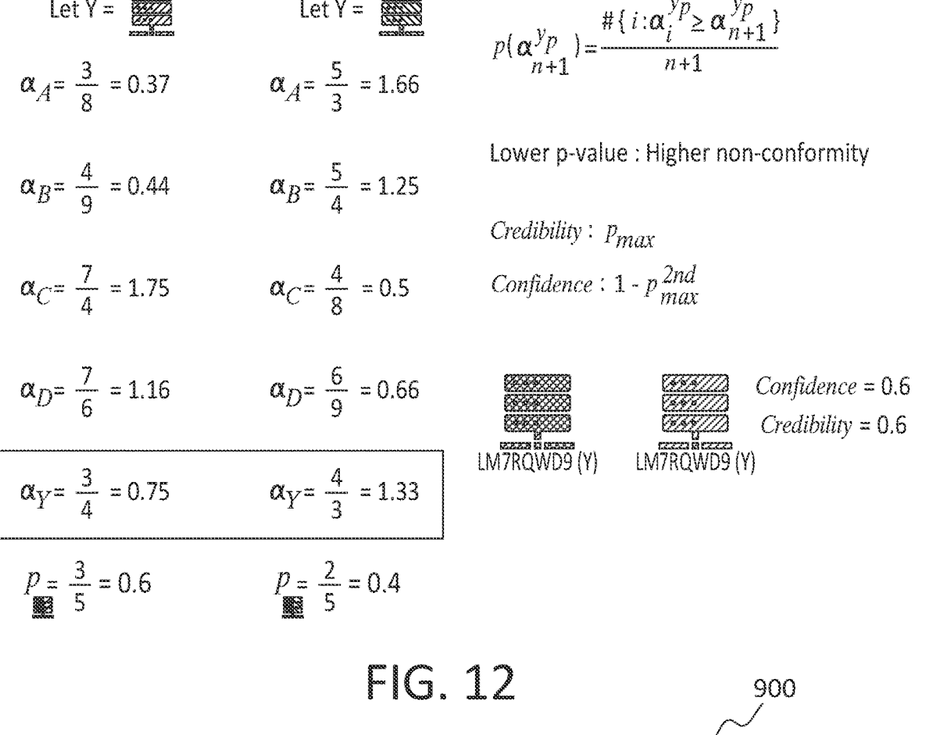
FIG. 12 discloses an approach to calculating p-values, risk score, and credibility, according to some embodiments.

Turning next to FIG. 12, a respective 'p' value, or 'p-value,' is calculated for each of the assumptions, as shown. The p-values may be calculated using the non-conformity scores obtained as shown in FIGS. 10 and 11. In the example of FIG. 12, the 'p' value corresponding to the assumption that asset Y is unhealthy is calculated to be 0.6, and the 'p' value corresponding to the assumption that asset Y is healthy is calculated to be 0.4, where a lower 'p' value indicates a relatively higher non-conformity. As such, the label with the highest 'p' value may be selected for the asset Y. In this example then, asset Y would be classified as unhealthy, or high-risk (HIGH).

In more detail, and with continued reference to FIG. 12, p-values may be calculated using the equation in the upper right portion of FIG. 12. For the purposes of illustration, consider calculation of the p-values for the first hypothesis A which, as noted earlier, assumes that the predicted label for asset Y will be HIGH risk. Thus, computation of the p-values for hypothesis A may proceed as follows:

(1) compute the non-conformity scores for all the data points, namely, the historical data points A, B, C, and D, and the new data point Y;

(2) count the number of data points (from the set A, B, C and D) whose non-conformity score a (alpha) is greater than or equal to the non-conformity score a (alpha) of the new data point, that is, data point Y—in the example of FIG. 10, alpha (C) and alpha (D) are greater than alpha (Y)—thus, a total count (including the alpha value of Y) of alpha values greater than, or equal to, the alpha value of Y is three, namely (C, D, Y); and (3) because there are a total of five data points (A, B, C, D, Y), the p-value (Y==HIGH RISK)=3/5.

This same approach may be used to calculate p-values for hypothesis B. In that example, only alpha (A), that is, 1.66, is greater than alpha (Y), that is, 1.33. Thus, the p-value for hypothesis B will be 2/5.

With continued reference to FIG. 12, a confidence score may then be calculated, which may be translated as an uncertainty quantifier, or risk score. The confidence score may be calculated using the two p-values determined earlier. Particularly, because only two hypotheses are used in the examples of FIGS. 10 (Hypothesis A) and 11 (Hypothesis B), only 2 p-values may have to be calculated. One of the p-values will be a maximum, and the other p-value will be the 2nd p-max. With the p-value information, confidence, or risk score, may then be calculated thus: confidence (C)=1-2nd p(max).

Figure 13:
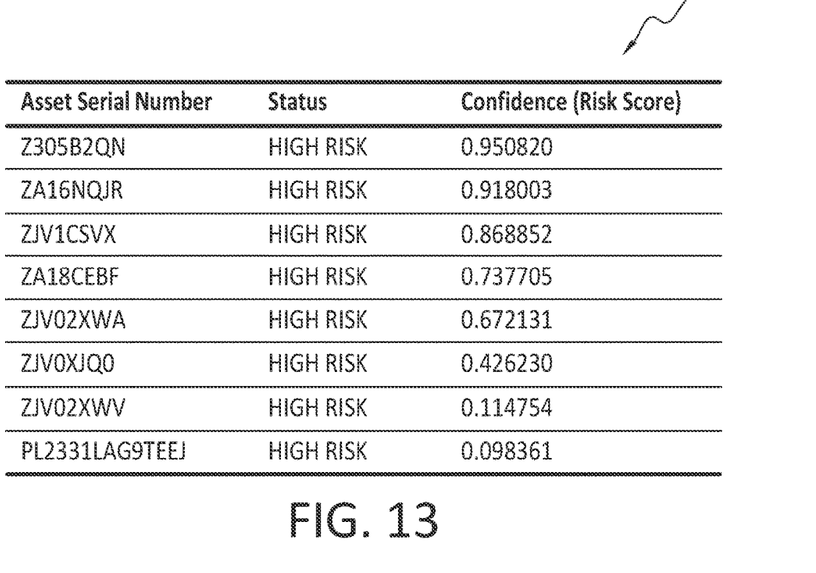
FIG. 13 discloses an example table listing various assets according to risk score.

Turning finally to FIG. 13, an example table 900 is shown that ranks a group of HIGH risk assets according to their respective risk score. A user such as an administrator may use such a table to determine, as among a group of HIGH risk assets, which asset(s) should be protected first.

H. Further Example Embodiments

Following are some further example embodiments of the invention. These are presented only by way of example and are not intended to limit the scope of the invention in any way.

Embodiment 1. A method, comprising: gathering respective performance data concerning each asset in a group of assets; clustering the performance data so as to define a first cluster and a second cluster, and data assets in the first cluster are assigned a HIGH RISK label and data assets in the second cluster are assigned a LOW RISK label; assigning a respective risk score to each of the assets, and the risk score comprises a quantified risk level for the asset to which the risk score has been assigned; ranking the assets with the HIGH RISK label according to their respective risk scores; and backing up a ranked asset based on an IO volume associated with that ranked asset.

Embodiment 2. The method as recited in embodiment 1, wherein the backup of the ranked asset is performed prior to a regularly scheduled backup of that ranked asset.

Embodiment 3. The method as recited in any of embodiments 1-2, wherein the backup of the ranked asset is performed according to a policy that specifies a backup trigger that is based on the IO volume.

Embodiment 4. The method as recited in any of embodiments 1-3, wherein each of the assets comprises a respective virtual machine that hosts an application which performed IOs that are included in the volume of IOs.

Embodiment 5. The method as recited in any of embodiments 1-4, wherein the risk score for each asset is quantified based on a non-conformity score for that asset.

Embodiment 6. The method as recited in embodiment 5, wherein the non-conformity score quantifies an extent to which a particular asset is similar to a neighbor asset.

Embodiment 7. The method as recited in any of embodiments 1-6, wherein the backup is triggered when the IO volume equals, or exceeds, an established IO volume threshold.

Embodiment 8. The method as recited in any of embodiments 1-7, further comprising validating the backup.

Embodiment 9. The method as recited in any of embodiments 1-8, wherein the ranked asset that is backed up is the asset with the highest risk score.

Embodiment 10. The method as recited in any of embodiments 1-9, further comprising calculating a p-value for each ranked asset, and the p-value is inversely related to a non-conformance score for that asset.

Embodiment 11. A system for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

I. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 14:
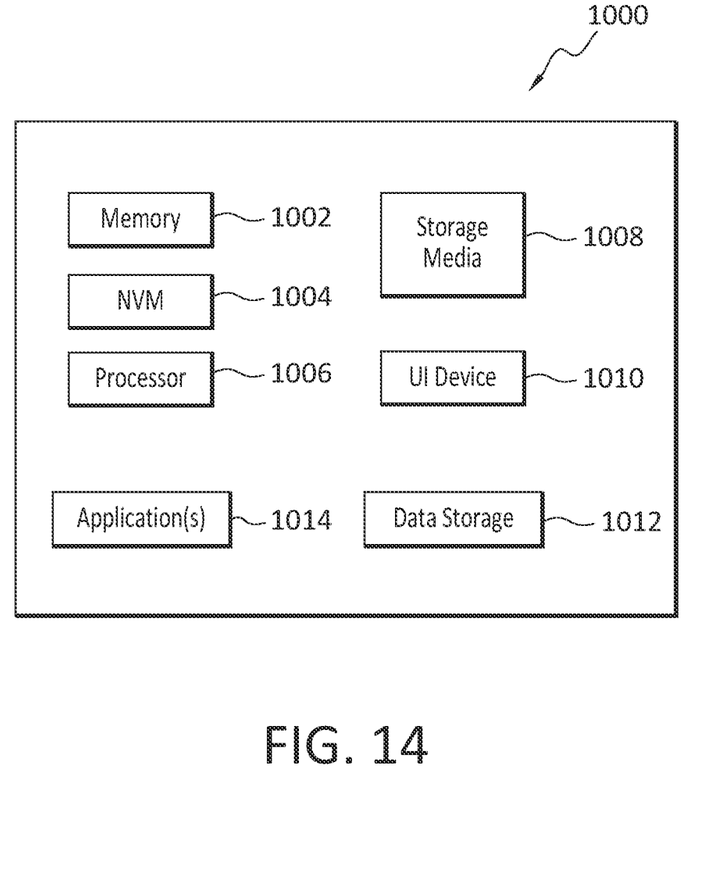
FIG. 14 discloses aspects of an example computing entity operable to perform any of the claimed methods, processes, and operations.

With reference briefly now to FIG. 14, any one or more of the entities disclosed, or implied, by FIGS. 1-13 and/or elsewhere herein, may take the form of, or include, or be implemented on, or hosted by, a physical computing device, one example of which is denoted at 1000. As well, where any of the aforementioned elements comprise or consist of a virtual machine (VM), that VM may constitute a virtualization of any combination of the physical components disclosed in FIG. 14.

In the example of FIG. 14, the physical computing device 1000 includes a memory 1002 which may include one, some, or all, of random access memory (RAM), non-volatile memory (NVM) 1004 such as NVRAM for example, read-only memory (ROM), and persistent memory, one or more hardware processors 1006, non-transitory storage media 1008, UI device 1010, and data storage 1012. One or more of the memory components 1002 of the physical computing device 1000 may take the form of solid state device (SSD) storage. As well, one or more applications 1014 may be provided that comprise instructions executable by one or more hardware processors 1006 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   gathering respective performance data concerning each asset in a group of assets;
   clustering the performance data so as to define a first cluster and a second cluster, and data assets in the first cluster are assigned a HIGH RISK label and data assets in the second cluster are assigned a LOW RISK label;
   assigning a respective risk score to each of the assets, and the risk score comprises a quantified risk level for the asset to which the risk score has been assigned;
   ranking the assets with the HIGH RISK label according to their respective risk scores; and
   backing up a ranked asset based on an input/output (IO) volume associated with that ranked asset.

2. The method as recited in claim 1, wherein the backup of the ranked asset is performed prior to a regularly scheduled backup of that ranked asset.

3. The method as recited in claim 1, wherein the backup of the ranked asset is performed according to a policy that specifies a backup trigger that is based on the IO volume.

4. The method as recited in claim 1, wherein each of the assets comprises a respective virtual machine that hosts an application which performed IOs that are included in the volume of IOs.

5. The method as recited in claim 1, wherein the risk score for each asset is quantified based on a non-conformity score for that asset.

6. The method as recited in claim 5, wherein the non-conformity score quantifies an extent to which a particular asset is similar to a neighbor asset.

7. The method as recited in claim 1, wherein the backup is triggered when the IO volume equals, or exceeds, an established IO volume threshold.

8. The method as recited in claim 1, further comprising validating the backup.

9. The method as recited in claim 1, wherein the ranked asset that is backed up is the asset with the highest risk score.

10. The method as recited in claim 1, further comprising calculating a p-value for each ranked asset, and the p-value is inversely related to a non-conformance score for that asset.

11. A non-transitory storage medium having stored therein instructions that are executable by one or more hardware processors to perform operations comprising:
   gathering respective performance data concerning each asset in a group of assets;
   clustering the performance data so as to define a first cluster and a second cluster, and data assets in the first cluster are assigned a HIGH RISK label and data assets in the second cluster are assigned a LOW RISK label;
   assigning a respective risk score to each of the assets, and the risk score comprises a quantified risk level for the asset to which the risk score has been assigned;
   ranking the assets with the HIGH RISK label according to their respective risk scores; and
   backing up a ranked asset based on an IO volume associated with that ranked asset.

12. The non-transitory storage medium as recited in claim 11, wherein the backup of the ranked asset is performed prior to a regularly scheduled backup of that ranked asset.

13. The non-transitory storage medium as recited in claim 11, wherein the backup of the ranked asset is performed according to a policy that specifies a backup trigger that is based on the IO volume.

14. The non-transitory storage medium as recited in claim 11, wherein each of the assets comprises a respective virtual machine that hosts an application which performed IOs that are included in the volume of IOs.

15. The non-transitory storage medium as recited in claim 11, wherein the risk score for each asset is quantified based on a non-conformity score for that asset.

16. The non-transitory storage medium as recited in claim 15, wherein the non-conformity score quantifies an extent to which a particular asset is similar to a neighbor asset.

17. The non-transitory storage medium as recited in claim 11, wherein the backup is triggered when the IO volume equals, or exceeds, an established IO volume threshold.

18. The non-transitory storage medium as recited in claim 11, further comprising validating the backup.

19. The non-transitory storage medium as recited in claim 11, wherein the ranked asset that is backed up is the asset with the highest risk score.

20. The non-transitory storage medium as recited in claim 11, further comprising calculating a p-value for each ranked asset, and the p-value is inversely related to a non-conformance score for that asset.

* * * * *